(12) United States Patent
Bernard (10) Patent No.: US 6,771,563 B1
(45) Date of Patent: Aug. 3, 2004

(54) APPARATUS FOR DEPLOYING A LOAD TO AN UNDERWATER TARGET POSITION WITH ENHANCED ACCURACY AND A METHOD TO CONTROL SUCH APPARATUS

(76) Inventor: François Bernard, Willem de Zwijgerlaan 91, Den Haag (NL), NL-2582 EK ( * ) Notice: Subject to any disclaimer, the term of this patent is extended or adjusted under 35 U.S.C. 154(b) by 0 days.

(21) Appl. No.: 10/239,236
(22) PCT Filed: Mar. 20, 2000
(86) PCT No.: PCT/NL00/00184

§ 371 (c)(1),
(2), (4) Date: Sep. 20, 2002

(87) PCT Pub. No.: WO01/70568

PCT Pub. Date: Sep. 27, 2001

(51) Int. Cl.[7] ........................... B63C 11/42; H04B 11/00
(52) U.S. Cl. ...................... 367/131; 73/170.13; 114/338
(58) Field of Search ............................ 367/87, 88, 131; 114/312, 337, 338; 73/170.13; 405/191, 188

(56) References Cited

U.S. PATENT DOCUMENTS

| | | | |
|---|---|---|---|
| 3,381,485 A | | 5/1968 | Crooks et al. |
| 4,118,782 A | * | 10/1978 | Allen et al. ............... 73/170.29 |
| 5,615,173 A | | 3/1997 | Brumley et al. |
| 5,640,369 A | * | 6/1997 | Capell, Sr. ................... 367/88 |
| 5,734,623 A | | 3/1998 | Ruffa |
| 5,947,051 A | | 9/1999 | Geiger |
| 5,995,882 A | | 11/1999 | Patterson et al. |

FOREIGN PATENT DOCUMENTS

EP  0 838 393  4/1998
WO  99 61307  12/1999

OTHER PUBLICATIONS

Taro Aoki et al., "Development of Expendable Opticlal Fiber Cable ROV UROV", Proceedings Of The Oceans Conference, US New York, IEEE, vol.–, Oct. 26, 1992, pp. 813–818, XP000346947 ISBN: 0–7803–0838–7 p. 816, left–hand, column, paragraph 2; figures 1–5.

Liddle: "TROJAN: Remotely Operated Vehicle" IEEE Journal Of Oceanic Engineering, No. 3,—Jul. 1986 pp. 364–372, XP002153951 New York, NY, USA p. 368, right–hand column, paragraph 6– p. 6, right–hand column, paragraph 2; figures 1–17.

Liu Yongkuan: "AUVS' Trends over the World in the Future Decade" Proceedings Of The Symosium On Autonomous Underwater Vehicle Technology, US, New York, IEEE, vol. – Jun. 2, 1992, pp. 116–127, XP000344365, ISBN: 0–7803–0704–6 p. 116, right–hand column, last paragraph.

R C Gwin III et al., "A Distributed Launch and Recovery System for an AUV and a Manned Submerisible", Proceedings of the Symposium on Autonomous Underwater Vehicle Technology, US New York, IEEE, vol.–, Jun. 2, 1992, pp. 267–278, XP000344385, ISBN: 0–7803–0704–6 p. 272, right–hand column, paragraph 4.

* cited by examiner

*Primary Examiner*—Ian J. Lobo
(74) *Attorney, Agent, or Firm*—Young & Thompson (57) ABSTRACT

Apparatus (50) for deploying an object to an underwater target position, the apparatus being provided with a beacon to transmit acoustic rays, a plurality of thrusters (56($i$), i=1, 2, . . . I, I being an integer) to control positioning of the apparatus with respect to the underwater target position, and a sound velocity meter to measure velocity of sound in a fluid surrounding the apparatus.

25 Claims, 8 Drawing Sheets

APPARATUS FOR DEPLOYING A LOAD TO AN UNDERWATER TARGET POSITION WITH ENHANCED ACCURACY AND A METHOD TO CONTROL SUCH APPARATUS

BACKGROUND OF THE INVENTION

The present invention relates to an apparatus for deploying an object to an underwater target position, the apparatus being provided with a beacon to transmit acoustic rays and a plurality of thrusters to control positioning of the apparatus with respect to the underwater target position.

Such an apparatus is known from WO 99/61307.

The prior art apparatus is used for deploying and/or recovering loads up to 1000 tons or more on the seabed at great depths, for instance, up to 3,000 meter or more. During deployment, the apparatus is controlled by controlling equipment on board of a vessel floating on the sea surface. The controlling equipment needs to know the exact location of the apparatus as accurate as possible. To that end, the beacon on board of the apparatus transmits acoustic rays through the sea water to the vessel. An appropriate acoustic receiver receives these acoustic rays and converts them into electrical signals used to calculate the position of the apparatus with respect to the vessel.

However, it is found that with increasing depth of the apparatus below the sea water the accuracy of the location measurement decreases due to bending of the acoustic rays in the sea water.

The object of the invention is therefore to further enhance the accuracy of the location measurement of such an apparatus during use in sea water or any other fluid. Moreover, such location measurement is needed on-line (real-time).

SUMMARY OF THE INVENTION

To obtain this object, the apparatus as defined at the outset is characterized in that it is provided with a sound velocity meter to measure velocity of sound in a fluid surrounding said apparatus. Thus, the velocity of sound at a certain location in the fluid can be continuously measured and used to update a sound velocity profile, i.e., data as to the sound velocity as a function of depth in the fluid. From these data, local bending of the acoustic rays can be determined on-line (real-time). So far, such on-line determination has not been possible. This allows corrections of location measurements in real-time.

In a preferred embodiment, the thrusters comprise a first set of thrusters arranged to provide a torque control function and a second set of thrusters arranged to provide at least a translation function, each thruster of the second set of thirsters being provided with a rotary actuator.

This is a very advantageous embodiment. Only two thrusters are necessary to prevent any undesired rotation of the apparatus attached to the load during deployment thus avoiding all problems related to twisting and turning of hoist wire the load, as already explained in WO 99/61307. Moreover, only two rotatable truss are needed to control positioning of the apparatus with its load attached to it to the desired horizontal coordinates. Thus, prior to lowering the load with the apparatus the apparatus can move the load to the desired horizontal coordinates and when these coordinates have been reached the hoist wire(s) can lower the load to its desired location on the seabed while the thrusters keep the load on the desired coordinates and prevent any undesired rotation of the load. Only when the desired target position on the seabed is reached a possible rotation of the load to a desired orientation need be carried out by the thrusters dedicated to the torque control.

It is observed that rotatable thrusters on an underwater apparatus for deploying loads to a desired position are known from U.S. Pat. No. 5,898,746.

The apparatus is preferably provided with load cells to measure weight of the load attached to the apparatus. When the load is put on the seabed by this weight suddenly decreases. Thus, a signal indicating that the weight of the load suddenly decreases can be used to determine when the apparatus may be detached from the load.

The invention also relates to a processing arrangement arranged to drive an apparatus for deploying an object to an underwater target position, the apparatus being provided with a beacon to transmit acoustic rays, a plurality of thrusters to control positioning of the apparatus with respect to the underwater target position, and a sound velocity meter to measure velocity of sound in a fluid surrounding the apparatus, the processing arrangement being provided with an acoustic receiver to receive the acoustic rays, the processing arrangement is arranged to use data derived from the acoustic rays in a calculation to determine the position of the apparatus characterized in that the processing arrangement is armed to receive online sound velocity meter data from the sound velocity meter to determine a sound velocity profile in the fluid and to calculate from the sound velocity profile bending of the acoustic rays transmitted by the apparatus through the fluid and to use this in the calculation to determine the position of the apparatus in real-time.

Such a processing arrangement is able to control driving of said apparatus to a desired location in a desired orientation with very high accuracy, even at great depth under water. While the apparatus with its load is lowered, the processing arrangement constantly receives sound velocity data and determines a sound velocity profile comprising sound velocity data from the water surface to the depth of the apparatus. The processing arrangement uses these data to determine acoustic ray bending as a function of the depth in the water and thus to correct any position calculation of the apparatus.

Such a processing arrangement may be on board of a vessel floating on the water surface. However, it is to be understood that part of the functionality of determining the sound velocity profile and calculating the acoustic ray bending may be carried out by one or more processors located elsewhere, even on board of the apparatus itself.

Preferably, a further sound velocity meter is provided just below the water surface to provide actual data regarding any ray bending in the water surface layers and thus to further correct any position calculation of the apparatus.

Reception of the acoustic rays transmitted by the apparatus is preferably performed by an acoustic array attached to the hull of the vessel.

In a very preferred embodiment, the vessel, the acoustic array and the apparatus are all provided with a distinct gyrocompass measuring respective heaves, rolls and pitches. Output data from these gyrocompass are used to further increase accuracy of the position measurement of the apparatus.

The invention also relates to a system comprising such a vessel and an apparatus together.

The invention also relates to a method of driving an apparatus for deploying an object to an underwater target position, the apparatus being provided with a beacon to transmit acoustic rays, a plurality of thrusters to control positioning of the apparatus with respect to the underwater target position, and a sound velocity meter to measure velocity of sound in a fluid surrounding the apparatus, the method comprising the steps of:

receiving the acoustic rays, using data derived from the acoustic rays in a calculation to determine the position of the apparatus characterized by the steps of:

receiving sound velocity meter data from the sound velocity meter and determining a sound velocity profile in the fluid, and calculating from the sound velocity profile bending of the acoustic rays transmitted by the apparatus through the fluid and to use this in the calculation to determine the position of the apparatus.

This method may be entirely controlled by a suitable computer program after being loaded by the processing arrangement Therefore, the invention also relates to a computer program product comprising data and instructions that after being loaded by a processing arrangement provides said arrangement with the capacity to carry out a method as defined above.

Also a data carrier provided with such a computer program product is claimed.

BRIEF DESCRIPTION OF THE DRAWINGS

Below, the invention will be explained in detail with reference being made to the drawings. The drawings are only intended to illustrate the invention and not to limit its scope which is only defined by the appended claims.

DESCRIPTION OF THE PREFERRED EMBODIMENT

Figure 1:
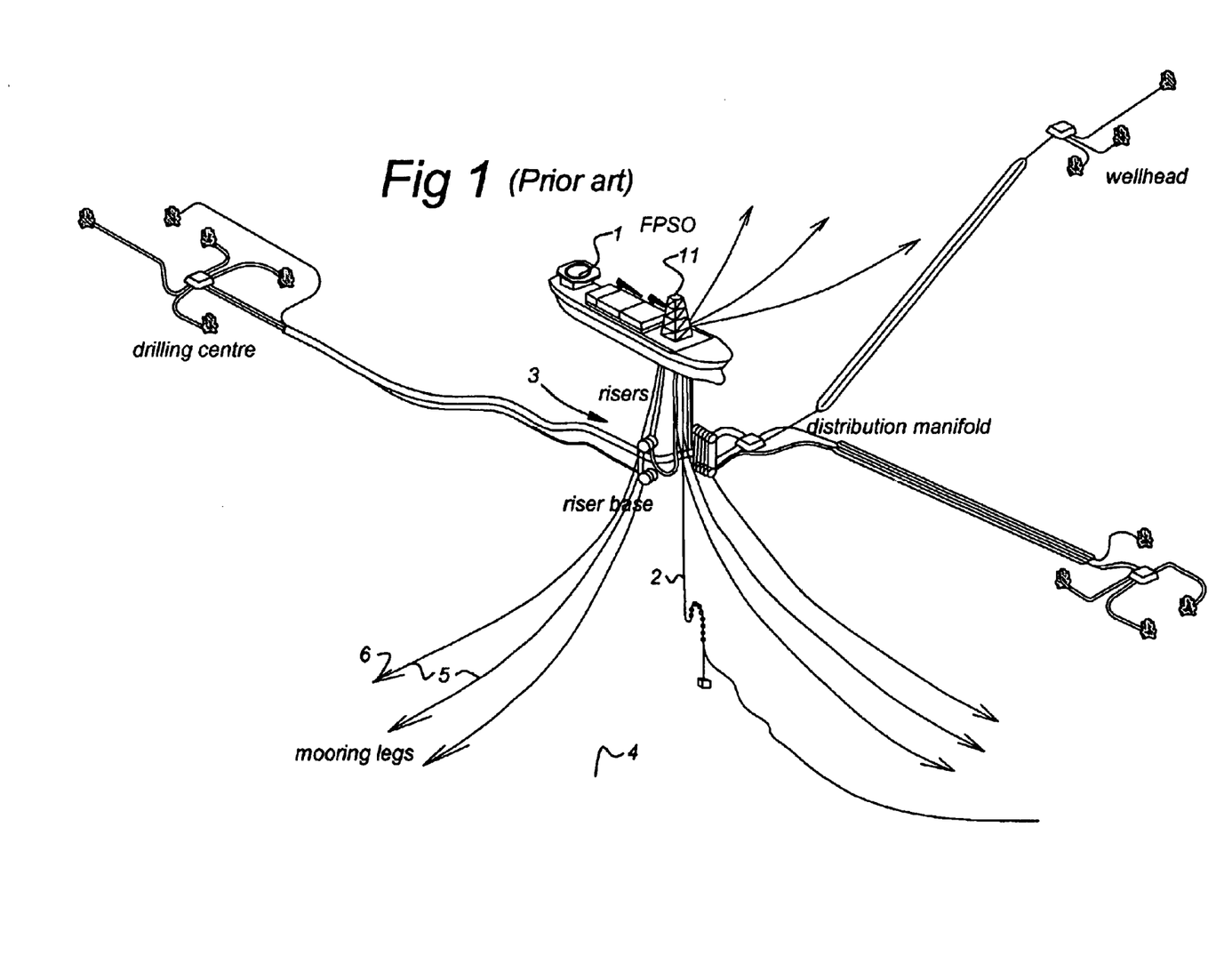
FIG. 1 shows a schematic overview of a FPSO (floating, production, storage and offloading system) dedicated to offshore petrochemical recoveries.

With reference to FIG. 1, the layout presents a FPSO 1 with swivel production stack 11 from which risers 2 depart, said risers connecting to their riser bases 3 at the seabed 4. During production lifetime, it is paramount for the FPSO 1 to remain within an allowable dynamic excursion range and therefor the FPSO 1 is moored to the seabed 4 by means of mooring legs 5 which are held by anchors 6, or alternatively by piles.

Exploitation of oil or gas by means of a production vessel 1, requires that several relatively heavy objects be positioned at the seabed 4 with a high accuracy.

To secure an appropriate and safe anchoring by means of the mooring legs 5, it is required that these mooring legs 5 have approximately the same length. In practice for this application anchors can be used with a weight of 50 ton and more, which are placed at the seabed 4 with an accuracy to within several meters. Moreover not only is the anchor 6 itself very heavy, but the mooring leg attached to the anchor 6 has a weight that equals several times the weight of the anchor 6 itself.

Also for other objects like the "templates", "gravity riser bases", "production manifolds" etceteras applies that these objects have to be put on the seabed 4 with relatively high accuracy.

The objects that are shown in FIG. 1 that are required for exploiting the oil and gas at sea and that have to be put on a seabed, are not only very heavy, but very expensive as well.

Figure 2:
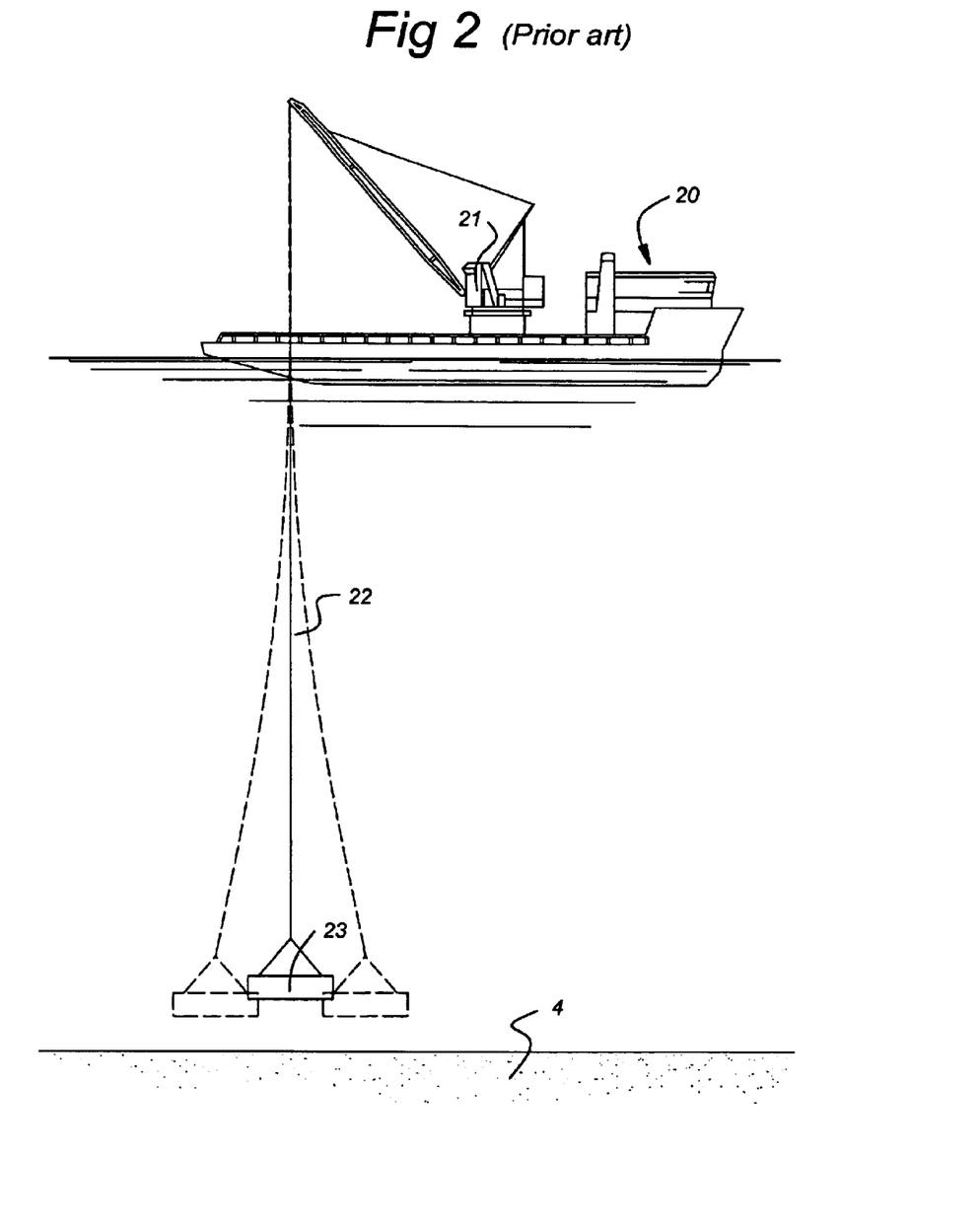
FIG. 2 shows a crane vessel according to the prior art and displaying a load rigged to the crane block with relatively long wire ropes whereby it is possible to see that the control of the load is virtually impossible at great depth.

FIG. 2 shows a vessel 20, according to the prior art, having hoisting means thereon, like a crane 21. The crane 21 is provided with a hoisting wire 22, by means of which an object or a load 4 can be put on the seabed 5. In order to position the load 23 it is necessary to move the surface support together with the crane 21.

The result will be that, at one given time, the load 23 inertia will be overcome but due to the load 23 acceleration, an uncontrollable situation will occur, whereby the target area will be overshot. Because of the fact that the hoisting wire 22 and the load 4 are susceptible to influences like the sea current, the load 23 will not move straight downward, when the hoisting wire 22 is being lowered. Also the heave, roll and pitch of the vessel 20 will have a negative influence on the accuracy that can be achieved.

Figure 3:
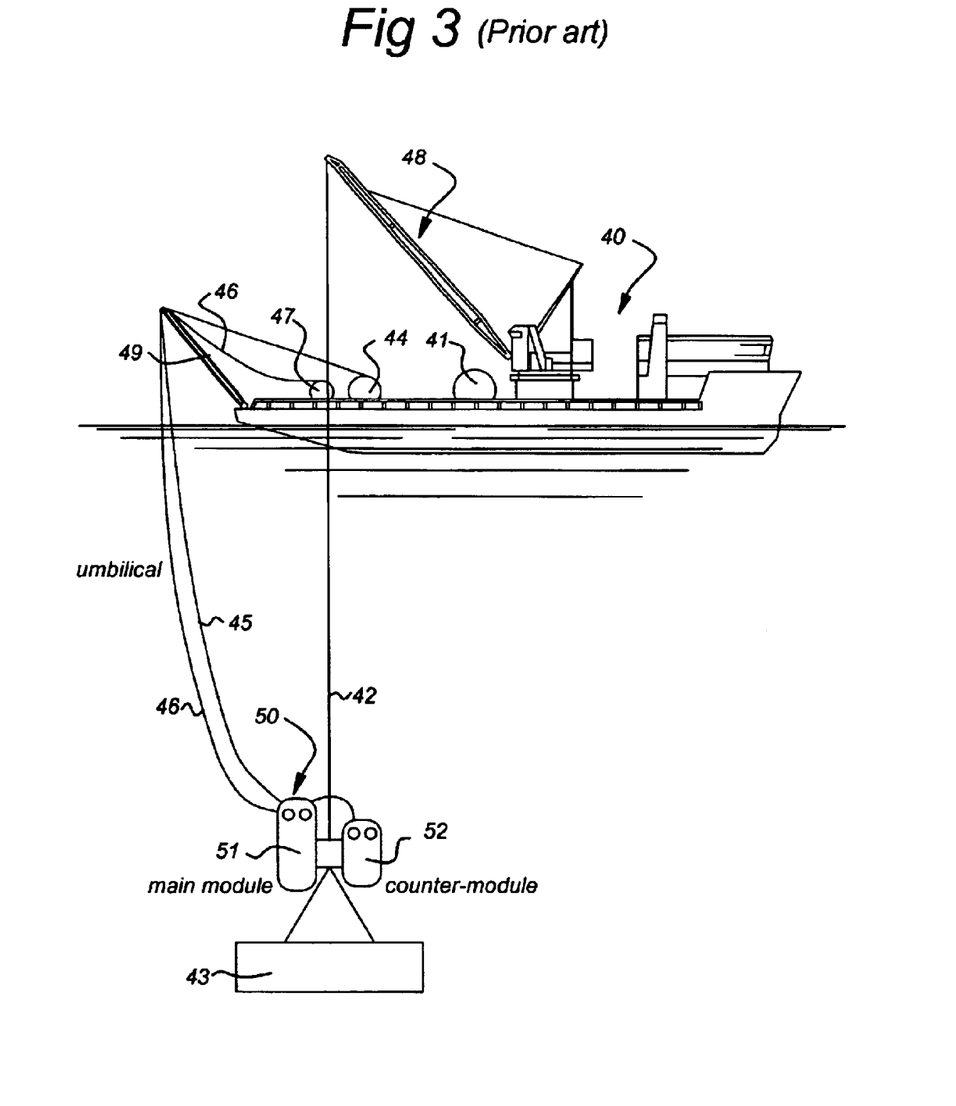
FIG. 3 shows a crane vessel and an underwater system for deploying and/or recovering a load to and/or from the seabed according to the prior art.

FIG. 3 shows a crane vessel 40 provided with an underwater apparatus or system 50 for deploying a load 43 on the seabed 4. The vessel 40 comprises first hoist means, for example a winch 41, provided with a first hoist wire 42. By means of this hoist wire 42 the load 43, for instance a template can be deployed and placed at the bottom of the sea.

As mentioned above, the exploitation of oil and gas fields using a floating production platform requires that several heavy objects must be placed at the seabed 4, moreover, these objects have to be placed on the seabed 4 with a very high accuracy. Because of the fact that nowadays the exploitation has to be done at increasing depths up to 3000 m and more, achieving the required accuracy is getting harder. E.g., one of the problems to be solved is the possible rotation of the load 43 carried by hoist wire 42.

In order to control the position of the load 43 when deploying it and in order to be able to position the load 43 on the seabed 4 within the required accuracy, the apparatus or system 50 has been secured to the lifting wire 42. A preferred embodiment of the system 50 will be described with reference to FIGS. 4, 5, 6a and 6b.

Figures 4, 4A:
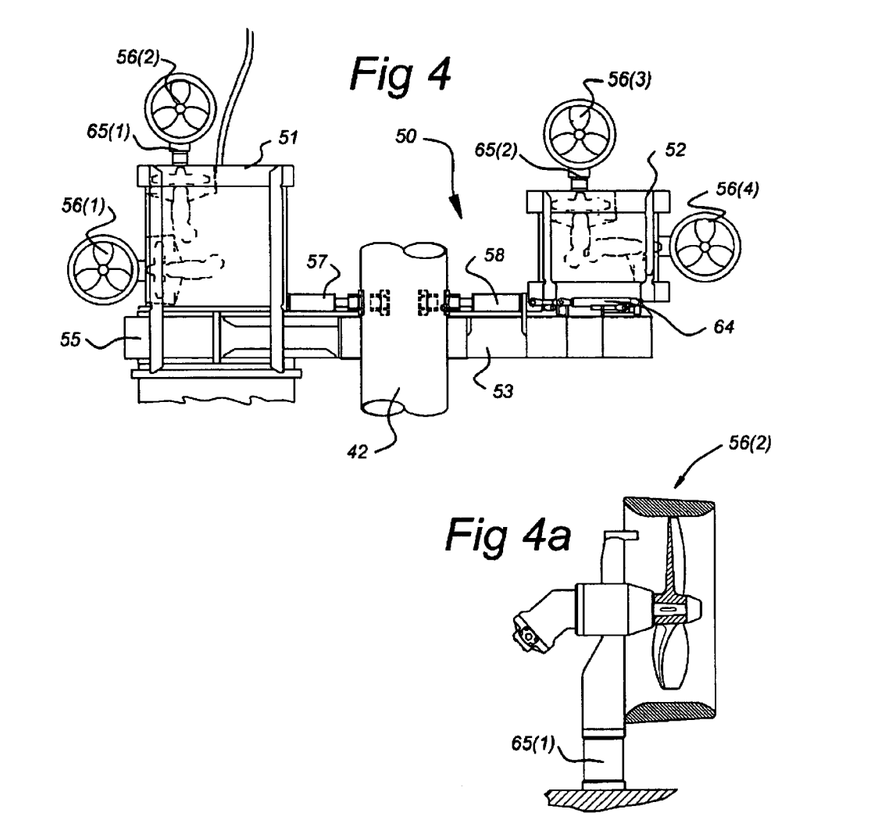
FIG. 4 shows a detailed overview of a possible embodiment of the underwater system.
FIG. 4a shows a detailed overview of one of the rotatable thrusters.
Figure 5:
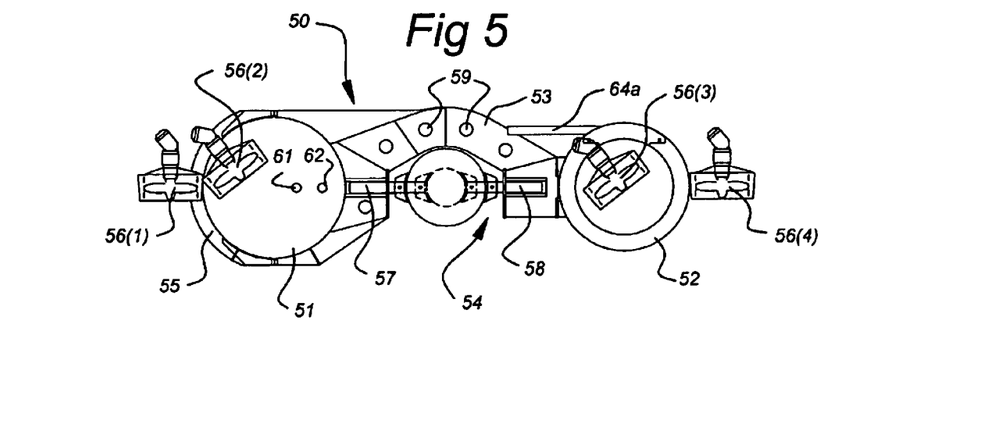
FIG. 5 shows the underwater system viewed from above.

The system 50 may engage the end of the lifting wire 42. Alternatively, the system 50 may directly engage the load 43 itself. The system 50 comprises a first or main-module 51, provided with drive means such as thrusters 56(i), i=1, 2, 3, . . . I, I being an integer (FIGS. 4 and 5). The system further comprises a second or counter module 52. This counter-module 52 is also provided with thruster 56(i). In use the thrusters of the main-module 51 and of the counter-module 52 will be positioned at opposite sides of the lifting wire 42.

The system 50 is coupled to the vessel 40 by means of a second lifting wire 45, which can be operated using second hoist means, for instance a second winch 44. The second hoist wire 45 is, for instance, set overboard by means of an A-frame 49. The second winch 44 and the second hoist wire 45 will be normally lighter than the first hoist means 48 and the primary hoist wire 42, respectively. The system 50 is further connected to the vessel 40 by means of an umbilical 46. This umbilical 46 can be attached to the hoist wire 45 or can be lowered from a tertiary winch 47 separately. The electricity wiring for providing power to the system 50, as well as electrical wiring or optical fibers are for instance accommodated in the umbilical. In the system 50 usually means are provided to convert the electrical power into hydraulic power. The hydraulic power consequently will be used for controlling i.a. the thrusters 56(i) and auxiliary tooling amenities.

Since lately the work is being done at an increasing depths, twisting and turning of the loads 43 and long hoist wires 42 is becoming a bigger problem still. Since heavy loads 43 are attached at the underside of the hoist wire 42, such twisting and turning can impel a relatively large wear on the hoist wires, so severe damage can occur at the hoist wires. This wear can be so severe that a hoist wire 42 will break and the load 43 will be lost. Another problem is that because of enormous twists in the wires the wires at the vessel can run out of the sheaves.

Because of the fact that the thrusters 56(i) of the main-module 51 and of the counter-module 52, respectively, are positioned at opposite sides of the lifting wire 42, a counter-torque can be exerted at the hoist wire 42 in both directions. In this way by means of the system an anti-twist device is formed. In order to improve the abilities of this anti-twist device, preferably, the distance between the main-module 51 and the counter-module 52 can be altered.

FIG. 4 shows a detailed overview of a possible embodiment of the system 50 for deploying a load 43 on the seabed 4. FIG. 5 shows the system according to FIG. 4, from above.

The system 50 comprises the main-module 51, the counter-module 52 and an arm 53. The arm 53 can be detached from the main-module 51. That means that the main-module 51 can also be used separately, as a modular system. The arm 53 is provided with a recess 54. On opposite sides of this recess 54 two jacks 57, 58 are provided, at least one of which can be moved relative to the other. In between the end surfaces of these jacks 57, 58 an object, such as a crane-block of load 43, can be clamped. In order to improve the contact between the jacks 57, 58 and the object, the respective ends of the jacks are accommodated with clamping shoes lined with a friction element, from a high friction material such as dedicated rubber.

In use, the thrusters 56(i) can be used to position the system 50 relative to a target area on the seabed 4. The thrusters 56(i) can be actuate from a first position mainly inside the system 50, to a position in which the thrusters projects out of the system 50. The two upper thrusters 56(2), 56(3) are rotatable with respect to the underwater system 50. They are, for instance, installed on respective rotary actuators 65(1), 65(2). The purpose thereof will be explained later. Thruster 56(2) has been shown on an enlarged scale in FIG. 4a.

In FIG. 5 it is shown that there are two positions 61, 62 on top of the main-module 51 to connect the main module to the second lifting wire 45 and/or to the umbilical 46. When the main-module 51 is used separately position 61 can be used. The main-module 61 will be balanced when the module 61 is deployed, both in the air and underwater.

When the system 50 is used, the connection between the vessel 40 and the system 50 will be fixed in position 62 in order to keep the system in balance, both in the air and underwater. To improve the balance of the system, an auxiliary counterweight 55 can be secured to the system 50.

In use, the apparatus 50 will not have any buoyancy. In order to improve the movability of the system under water, the arm 53 is provided with holes 59, in order to avoid structural damage due to an increasing pressure while being lowered and to ensure quick drainage during the recovery phase.

As mentioned above, it is advantageous when the counter-module 52 can be moved relative to the main-module 51. This can be accomplished by using jacks 64a.

The module 51 comprises an outer frame and an inner frame (both not shown). The inner frame preferably is cylinder-shaped. By connecting the outer frame to the inner frame, a very strong construction can be accomplished. The strength of the construction is necessary in order to avoid premature fatigue in the system.

The module 51 is, for instance, partly made of high-tensile steel and thereby designed to be used as integral part of either the first 42 or second hoist wire 45. This means that the top side of the module 51 will be connected to a first part of the hoist wire 45, and that the underside of he module 51 will be connected to a second part of the hoist wire 45, or the underside of the module 51 will be attached directly to the load. In this way the load on the hoist wire will be transferred through the module 51.

Figure 6A:
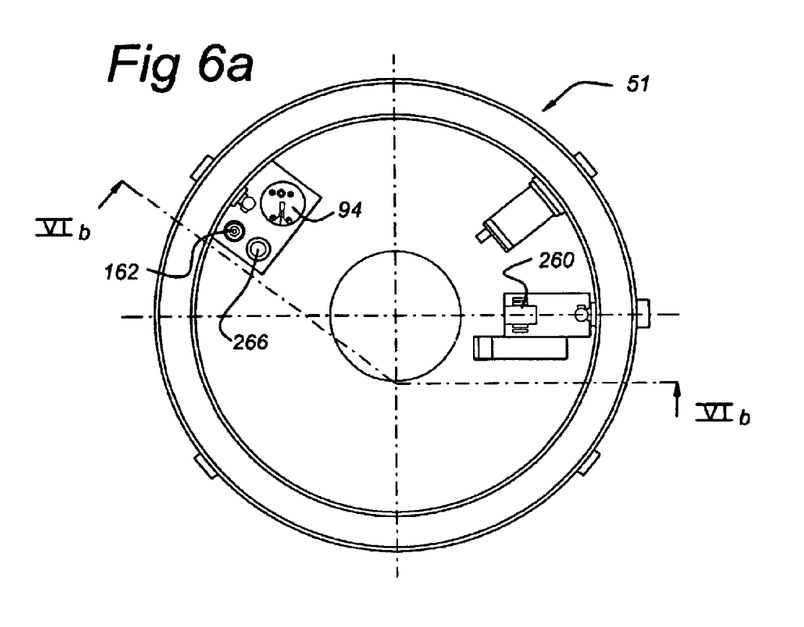
FIGS. 6a and 6b schematically show the underside of the main module with some detectors.
Figure 6B:
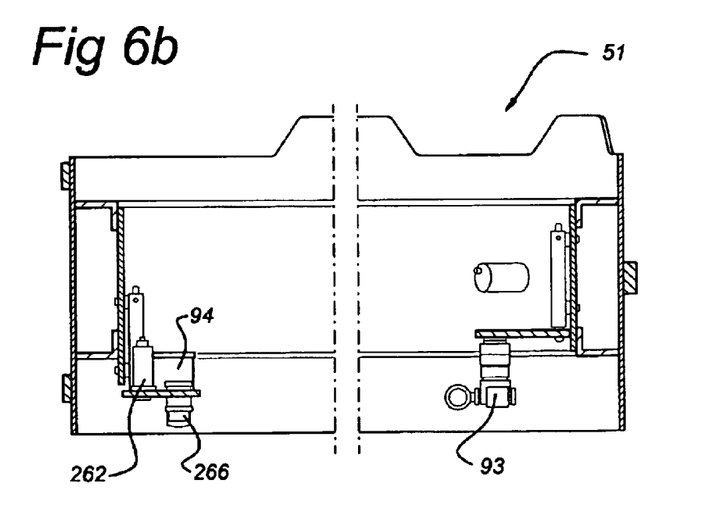

As mentioned before, the module 51 is provided with a thruster drive 270 for converting electrical power, delivered through the umbilical 46, into hydraulic power. This thruster drive 270 may comprise motors, a pump, a manifold and a hydraulic reservoir. Such converting means are known to persons skilled in the art and need no further explanation here. In order to communicate relevant data as to its position, both absolute and relative to other objects, to the control system and/or an operator on board of the vessel 40, the module 51 further comprises sensor means and control means that will be explained in detail below. The module 51 is equipped with a sensor junction box. Moreover, the module 51 comprises light-sources 87, a gyrocompass 256 including heave, roll and pitch sensors, a pan and tilt color camera 97, a USBL responder 255 including a digiquartz depth sensor 253, a sound velocity meter 258, and a sonar-dyne mini Rovnav 264. At the underside of the module 51 are mounted on several platforms light sources 94, a pan and S.I.T. camera 93, an altimeter 262, a Doppler log unit 266, and a dual head scanning sonar 260. They are installed there to have only clear sea water below them, in use. They are schematically shown in FIGS. 6a and 6b. It is to be understood that they may be located elsewhere, e.g., at the underside of module 52. Moreover, load cells 268 are part of the system 51. All these components are schematically indicated in FIG. 7b.

As mentioned above, the use of high resolution sonar equipment 260 together with a distance log, measured by Doppler log unit 266, is important to achieve the required accuracy, once the load has reached its intended depth. The sonar equipment 260 will be used to determine the position with respect to at least one object positioned at the seabed. Using the distance log, it will then be possible to dissociate the positioning activities from the surface support, as well as from any other acoustic transponder devices such as LBL (Long Base Line) arrays (or other, e.g., USBL), while accuracy in the order of centimeters will be achieved within a large radius.

Figure 7A:
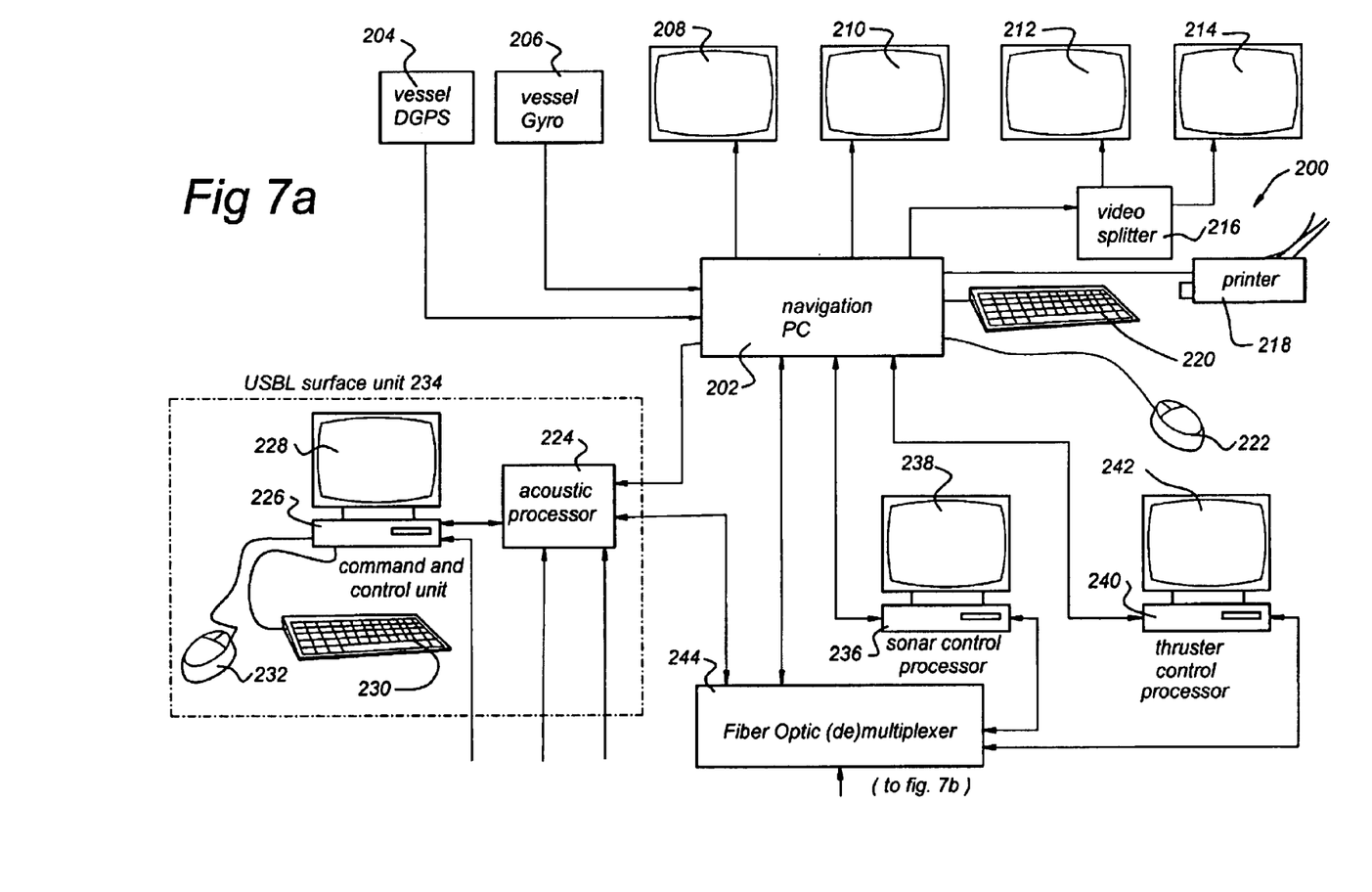
FIG. 7a shows a schematic block diagram of the electronic equipment on board of the vessel.
Figure 7B:
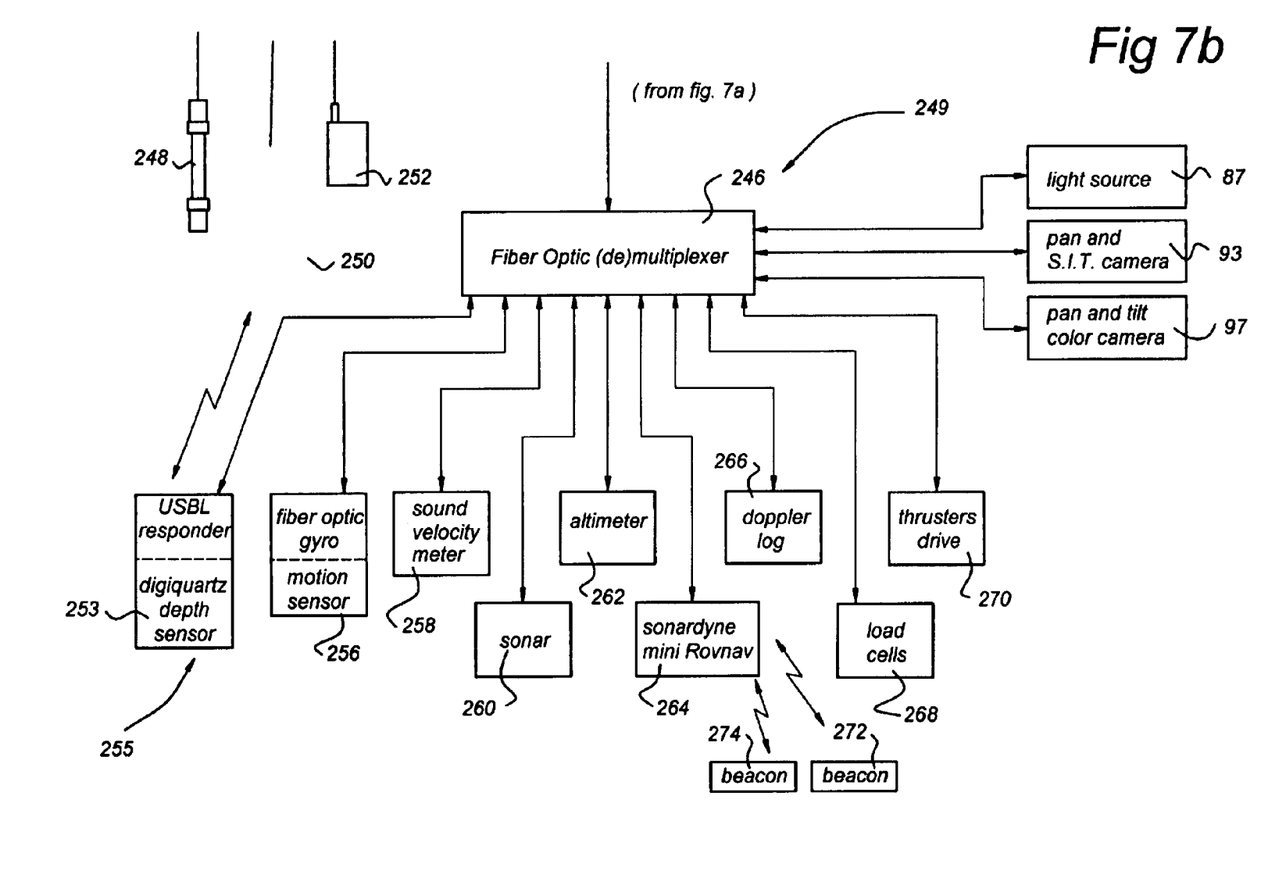
FIG. 7b shows a schematic block diagram of the electronic equipment related to an acoustic array and related to the underwater system.

FIG. 7a shows the electronic equipment 200 installed on the vessel 40, whereas FIG. 7b shows deployable acoustic array 250 with velocity meter 248 and a gyro compass 252. FIG. 7b also shows underwater electronic equipment 249 installed on the underwater system 50.

The equipment shown in FIG. 7a comprises four processors: a navigation processor 202, acoustic processor 224, a sonar control processor 236, and a thruster control processor 240. The navigation processor 202 is interfaced to the other three processors 224, 236, 240 for mutual communications and complementary.

The navigation processor 202 is also interfaced to a surface positioning equipment DGPS (Differential Global Positioning System) 204, a vessel gyrocompass 206, four display units 208, 210, 212, 214, a printer unit 218, a keyboard 220, a mouse 222, and a fiber optic (de) multiplexer unit 244. If necessary, a video splitter 216 may be provided to transmit one SVGA signal output of the navigation processor 202 to two or more display units. In FIG. 7a, display units 212, 214 are connected to the navigation processor 202 via video splitter 216.

The fiber optic (de)multiplexer unit 244 is also connected to the acoustic processor 224, the sonar control processor 236, and the thruster control processor 240.

The acoustic processor 224 is connected to a command and control unit 226 which is connected to a keyboard 230, a mouse 232 and a display unit 228, all together forming a USBL surface unit 234.

The acoustic processor 224 is connected to deployable acoustic array 250 with motion sensor unit 252 and velocity meter 248. In use, the acoustic array 250 is, preferably, mounted 2.5 meters below the keel of vessel 40.

The fiber optic (de)multiplexer unit 244 is connected to a further fiber optic (de)multiplexer 246 installed on the underwater system 50. An optical fiber interconnecting both fiber optic (de)multiplexers 244, 246 is preferably accommodated in umbilical 46 (FIG. 3).

The sonar control processor 236 is connected to a display unit 238. The thruster control processor 240 is connected to a display unit 242.

The underwater equipment 249 is shown in FIG. 7b in the form of a block diagram. The USBL responder 255 with digiquartz depth sensor 253, a gyrocompass with motion sensors 256, (removable) sound velocity meter 258, a dual head scanning sonar 260, altimeter 262, sonardyne mini Rovnav 264, Doppler log 266, load cells 268, and thruster drive control 270 are all connected to the fiber optic (de) multiplexer 246.

Moreover, FIG. 7b shows two beacons 272, 274 that can be installed on the seabed or on the load to be deployed (or on other structures already on the seabed). These beacons 272, 274 can, e.g., be interrogated by means of the sonardyne mini Rovnav 264 (or equivalent equipment) to transmit acoustic signals back to the system 50 that can be used by the system 50 itself to determine and measure distances and orientations relative to these beacons. Such an acoustic telemetry link results in very high precision relative position measurements. The number of such beacons is not limited to the two shown in FIG. 7b.

Functionality

The functions of the components shown in FIGS. 7a and 7b are the following.

The navigation processor 202 is collecting the surface positioning equipment data (DGPS receivers, DGPS corrections, vessel's gyrocompass and vessel's motion sensors 204 and 206), in order to calculate and display the vessel's attitude and its fixed offsets.

Via the fiber optic (de)multiplexers 244 and 246, the navigation processor 202 sends different settings to the navigation instruments of the system 50, i.e., Doppler log 266, altimeter 262, and gyrocompass and motion sensors 256. After setting up, it receives the data from those instruments, as well as, via the acoustic processor 224, the range/bearing and depth data of the system 50 to calculate and to display the attitudes and absolute coordinates of the system 50.

An integrated software in the navigation processor 202 has been developed, including a dynamic positioning controller software able to work in manual or automode to decide the intended heading of the system 50 and to select between many way points and to carry out the intended positioning. Moreover, the operator on board of the vessel can input offsets to the selected way point, the offsets being input with XY coordinates relative to the heading of the system 50. There is another possibility to select several other types of sub-sea positioning devices via an arrangement of specifically designed windows on the screens (electronic pages) of the display units 208–214, to stabilize and filter the position. To ensure that the operator has as many tools as possible to get the optimal result, there is an other part in the software showing different status of the sub-sea instruments in use for the calculation of the position of the system 50 on-line (real-time).

Embarked gyrocompass 256 including heave, roll and pitch sensors 88 on board of the system 50 provides data as to the exact attitudes of both the system 50 and the load 43 to be installed on the sea bed. At the surface of the sea, in a control van, operators are able to check those attitudes on-line (real-time), during descent but also once the load 43 is laying on the sea bed for final verification.

The vessel gyrocompass 206, as well as the gyrocompass with motion sensors 252 installed on the acoustic array 250 that could be used for the same functions, is transmitting the vessel's heading to the navigation processor 202. The navigation processor 202 will use this vessel's heading to calculate different offsets.

The display units 208, 210, 212, and 214, respectively, are arranged to display navigation settings, a view of the sea bed, a view of the surface, in the control van for the operators and another one on the vessel bridge for the marine department operators.

The USBL command and control unit 226 consists of a personal computer providing control and configuration of the system and displaying the man-machine-interface for operator control.

The acoustic processor 224, preferably, consists of one VME rack which performs correlation process on received signals, corrections to bathy-celerimetry and vessel's attitude. Moreover, it calculates coordinates of any beacon used. The acoustic processor 224 is linked to the navigation processor 202 through Eternet.

The acoustic array 250 includes means for transmission and reception. The acoustic array 250 can be used as a transducer to acoustically communicate with one or more beacons. Such a transducer mode is advantageous when the umbilical 46 fails and is unable to transmit interrogation signals down to the system 50. Then, acoustic interrogation signals can be transmitted down by the transducer directly through the sea water. In all other cases, the acoustic array 250 will be used in a reception mode. Reception is done with two orthogonal reception bases which measure distances and bearing angles of beacons relative to the acoustic array 250. Each reception base includes two transducers. Each received signal is amplified, filtered and transferred to the acoustic processor 224 for digital signal processing.

The sound velocity meter 248 installed on the acoustic array 250 is updating in real-time the critical and unsettled sound velocity profile situated just underneath the vessel 40. This is of great importance since turbulences of the sea water appear to be very heavy in these layers just underneath the vessel 40.

The gyrocompass 252 is preferably used as motion sensor unit transmitting the acoustic array attitude to the acoustic processor 224 in order to rectify data as to the position of the system 50 sub-sea.

In a preferred embodiment, the beacon 254 is working in a responder mode and has the following characteristics:
the triggering interrogation signal generated by the acoustic processor 224 is not acoustic but electrical and is transmitted to the beacon 254 through the cable link between the vessel 40 and the system 50;
interrogation frequencies are remotely controlled by an operator through the man-machine-interface.

As indicated above, the beacon 254 can also be used in a transponder mode. Then, the beacon 254 is triggered by a surface acoustic signal transmitted by the acoustic array 250 and then delivers acoustic reply signals to the acoustic array 250 through a coded acoustic signal.

The digiquartz depth sensor 253 included in the beacon 254 allows transmitting very accurate depth data of the system 50 to the acoustic processor 224. The acoustic processor 224 uses these data to improve the calculation of the sub-sea positioning of the system 50 and its load 43.

The sound velocity meter 258, mounted on the underwater system 50, is transmitting data as to the velocity of sound in sea water at the depth of the underwater system 50 to the acoustic processor 224 during descent and recovery. The sound velocity data is used to update calculated sound velocity profiles in the sea water as a function of depth in real-time and to calculate acoustic ray bending from these profiles as function of depth in the sea water and thus to correct calculations of the sub-sea position of the system 50.

The dual head scanning sonar 260 is used to measure ranges and bearings of the system 50 to any man-made or natural target on the seabed and to output corresponding data as digital values to the navigation processor 202. The positions of such man-made or natural targets can either be predefined or the navigation system can allocate coordinates to each of the selected objects. After the objects have been given coordinates, they can be used as navigation references in a local coordinate system. This results in an accuracy of 0.1 meter in relative coordinates.

The altimeter 262 mounted on the system 50 is measuring the vertical distance of the underwater system 50 to the seabed and transmits output measuring data to the acoustic processor 224.

The Doppler log unit 266 provides data as to the value and direction of the sea water current at the depth of the underwater system 50. These data are used in two ways.

First of all, the data received from the Doppler log unit 266 and the gyrocompass with motion sensor 256 is used by the acoustic processor 224 to smooth on-line (real-time) the random noise related to using USBL. To obtain such a smoothing a filter is used, e.g., a Kalman filter, a Salomonsen filter, a Salomonsen light filter, or any other suitable filter in the main processor unit 224. Such filters are known to persons skilled in the art. A brief summary can be found in appendix A.

Secondly, the output data of the Doppler log unit 266 regarding current strength, current direction, together wit data regarding present and intended heading of the underwater system 50 are transmitted to the thruster control processor 240 via the navigation processor 202. Based on the intended direction the thruster drive control 270 will be automatically controlled. Manual control may also be provided for.

In a very advantageous embodiment the Doppler log unit 266 (or any other suitable sensor) is used to measure temperature and/or salinity of the sea water surrounding the system 50. Data as to local temperature and/or salinity is transmitted to the navigation processor 202 that calculates and updates temperature and/or salinity profiles as a function of depth in the sea water. These data are also used to determine acoustic ray bending through the sea water and, thus, to correct calculations of the position of the system 50.

The sonardyne mini Rovnav 264 is optional and may be used to provide relative position of the system 50 to local beacons on the seabed as explained above. For instance, a Long Base Line (LBL) array may already be installed on the seabed and used for that purpose.

The load cells 268 are used to measure the weight of the load 43 as engaged by the underwater system 50. When this weight decreases this is an indication that the load is now placed on the seabed (or other target position) and that the system 50 may be detached from the load 43. Output data from the load cells is transmitted to the navigation processor 202 through the (de)multiplexers 244, 246.

The thruster drive control 270 is used to drive the thrusters 56($i$) in order to drive the underwater system 50 to the desired position as will be explained in detail below.

In FIG. 7a, four different processors 202, 224, 236 and 240 are shown to carry out the functionality of the system according to the invention. However, it is to be understood that the functionality of the system can, alternatively, be carried out by any other suitable number of cooperating processors, including one main frame computer, either in parallel or master slave arrangement. Even remotely located processors may be used. There may be provided a processor on board of the underwater system 50 for performing some of the functions.

The processors may have not shown memory components including hard disks, Read Only Memory's (ROM), Electrically Erasable Programmable Read Only Memory's (EEPROM) and Random Access Memory's (RAM), etc. Not all of these memory types need necessarily be provided.

Instead of or in addition to the keyboards 220, 230 and the mice 222, 232 other input means known to persons skilled in the art, like touch screens, may be provided too.

Any communication within the entire arrangement shown may be wireless.

In FIG. 5, the situation is shown that the two upper thrusters 56(2) and 56(3) are directed in an other direction than the thrusters 56(1) and 56(4). The thrusters 56(2), 56(3) are mounted on rotary actuators 65(1), 65(2), which allow the thrusters 56(2), 56(3) to be vectored by turning them up to 360°. Preferably, the thrusters 56(2), 56(3) can be independently controlled such that they may be directed each to a different direction.

To allow the thruster control processor 240 to accurately position the underwater system 50, a common coordinate system must be established between the navigation processor 202 and the thruster control processor 240. First of all, there is a standard coordinate system used by the navigation processor 202. However, two other coordinate reference systems are preferably established for the underwater system 50.

Figure 8:
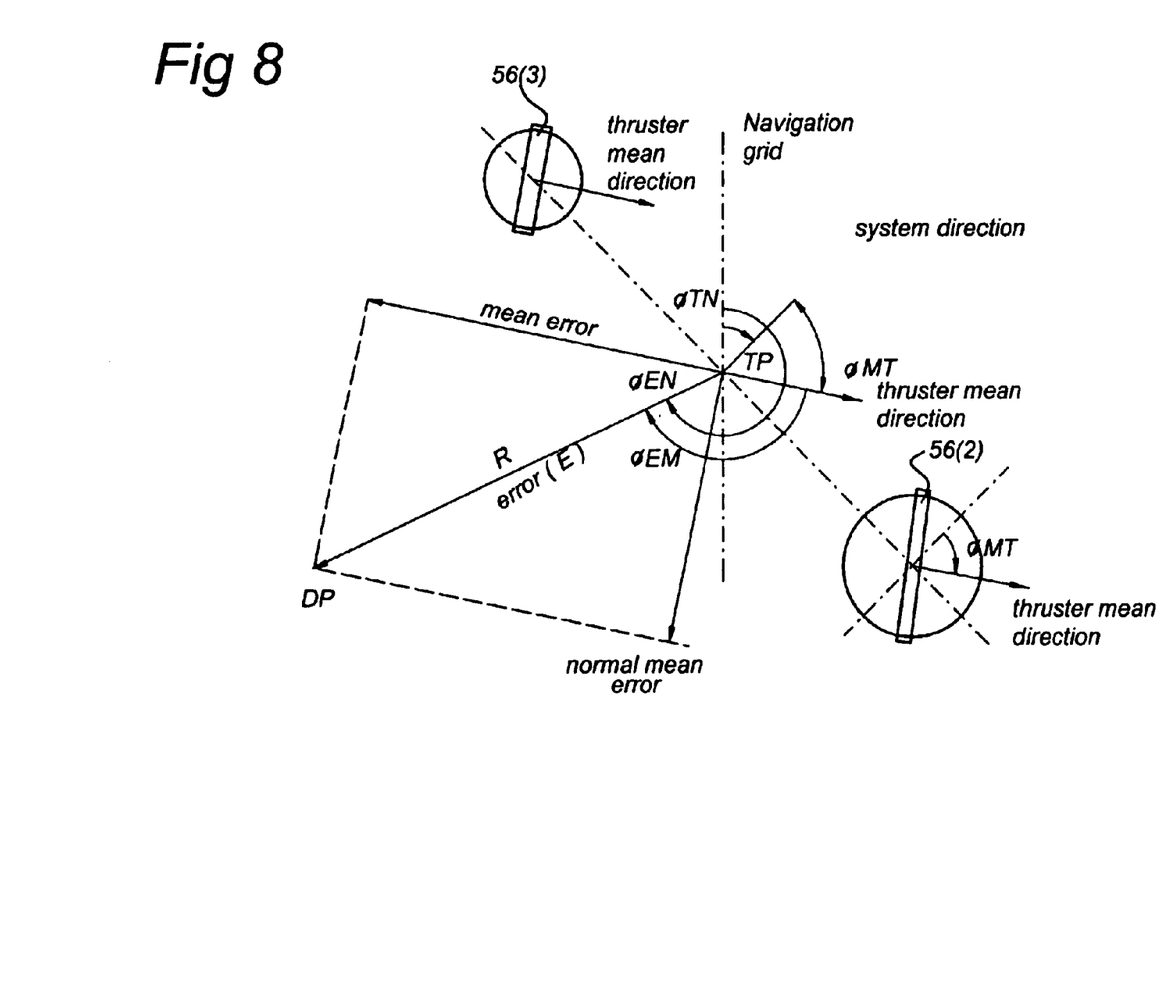
FIG. 8 shows the definition of three different coordinate systems used during driving the underwater system to its target position.

FIG. 8 shows the three different coordinate systems. The coordinate system related to the navigation processor 202 is indicated with "navigation grid". This coordinate system uses this "navigation grid" direction and its normal.

The thrusters 56(2), 56(3) are controlled to provide a driving force in a direction termed "thruster mean direction". This direction together with its normal defines the second coordinate system.

The third coordinate system is defined relative to the "system direction" which is defined as the direction perpendicular to a line interconnecting the thrusters 56(1), 56(4).

Now, an error in the path followed by the underwater system 50 can be defined in terms of an error vector that can be split into one component parallel to the thruster mean direction termed the "mean error" and a component normal to the thruster mean direction termed "normal mean error". Appropriate sensors on the underwater system 50 will provide the navigation processor 202 with the thruster mean direction and system direction. From these data the navigation processor 202 will create a grid as shown in FIG. 8.

The error is defined as the desired position DP minus the system position TP such that a vector $R\Phi_{EN}$ is generated relative to the navigation grid reference, i.e.:

$$DP-TP=R\Phi_{EN}$$

Moreover:

$\Phi_{TN}$ is the system orientation minus the navigation grid orientation, $\Phi_{MT}$ is the mean thruster orientation minus the system orientation.

Then:

$$DP-TP=R\Phi_{EM}, \Phi_{EM}=\Phi_{EN}-(\Phi_{TN}+\Phi_{MT})$$

Now $R\Phi_{EM}$ is known, the mean and the normal to the mean errors can be calculated.

The two thrusters 56(1) and 56(4) are used to counteract the twisting forces applied by the lifting cable 42, equipment drag and the rotational moment induced by the vectoring of positioning control. A control loop for the orientation requires that the navigation processor 202 is provided with the actual system orientation and the desired system orientation. The actual system orientation is measured by the gyrocompass 256. The desired orientation is manually input by an operator. From these two orientations the control loop in the navigation processor 202 computes an angular distance between the required orientation and the actual orientation as well as the direction of rotation required to move the system 50 accordingly. A simple control loop controlled by the thruster control processor 240 then adjusts the power to the thrusters 56(1) and 56(4) to rotate the system 50 appropriately.

On power up of the system 50, both thrusters 56(2) and 56(3) will be, preferably, orientated such that the thruster mean direction is directed parallel to the system direction. Then, the thrusters 56(2), 56(3) will be given a small vector angle deviation from the system direction to assist in positioning the system 50 in two planes. The size of this vector is, preferably, manually adjustable and may be needed to be configured for each different job in dependence on actual sea conditions. Once the thrusters 56(2) and 56(3) have been centered and vectored, a positioning loop can take over control of the system 50.

The positioning loop comprises two more phases.

In the first next phase, which is executed while the system 50 is still near the sea surface, the sea current direction will be measured by the Doppler log unit 266. The sea current direction will be transmitted to the navigation processor 202. Using this direction, the thruster control processor 240 receiving proper commands from the navigation processor 202 will drive the rotary actuators 65(1), 65(2) such that the thruster mean direction substantially opposes the sea current direction. During this rotation of the rotary actuators 65(1), 65(2) none of thrusters 56(i) is powered. The system direction will be measured by the fiber optic gyrocompass 256. The depth is constantly measured by the digiquartz depth sensor 254 and the altitude by the altimeter 262. The mean and normal to the mean errors as calculated in accordance with the equations above will then be used by the positioning loop to apply power to the thrusters 56(2) and 56(3) to drive the system 50 to the desired location.

During driving the system 50 with load 43 to the desired coordinates by means of thrusters 56(2), 56(3) the thrusters 56(1), 56(4) are used to counteract any rotation of the system 50 with its load 43. This provides for better control since, especially for heavy loads, rotation movements may result in other undesired movements of the load, which may be difficult to control. When the system 50 with its load is on the desired coordinates the load together with the system 50 is lowered by means of the hoisting wire 42. During descending the load 43, the load 43 is constantly controlled by system 50 to keep it on the desired location without any rotation.

In a next phase, the system 50 is for instance approximately 200 m or less from the seabed 4. Then, the Doppler log unit 266 goes into a bottom track mode. This changes the operation into a more accurate and fast responding mode for the final approach of the target location on the seabed 4. Now, the Doppler log unit 266 and the gyrocompass with motion sensors 256 are used to filter the random noise of the USBL. Once filtered, a good read out of the navigation data including an accurate velocity of the system 50 will make the position control loop both extremely rapid and stable. A very fine tuned control loop results in which control up to some centimeters movement is achieved. Now, the sonar unit 260 and the Doppler log unit 266 are used to provide information regarding the surroundings of the target point such that the load 43 can be positioned on the right coordinates and in the right orientation. Then, a rotation, if necessary, may be applied to the load 43 by thrusters 56(1), 56(4) as controlled by thruster control processor 240.

Two control loops are provided for the thrusters 56(2), 56(3): a mean error control loop and a further control loop to reduce the normal mean error.

The mean error control loop will adjust the power equally to both thrusters 56(2), 56(3) so as to reduce the mean error. As the system 50 reaches the target coordinates the driving power to the thrusters 56(2), 56(3) will be reduced to such a level that the system 50 is able to maintain its position in the sea current. In other words, initially, the driving power was set at a level that was proportional to the mean error. However, as the system 50 moves closer to the target coordinates the control loop will slowly reduce the driving power applied to the thrusters 56(2), 56(3). As the system 50 reaches the target coordinates an equilibrium will be reached where the driving power to the thrusters 56(2), 56(3) counteracts the strength of the sea current. The mean error control loop provides equal power with equal sign to both thrusters 56(2), 56(3).

A further control loop is applied to reduce the normal mean error. This further control loop adjusts the individual power applied to the thrusters 56(2), 56(3) such that a movement perpendicular to the sea current is generated. The further control loop applies equal power of opposite sign to both thrusters 56(2), 56(3) to this effect. The power applied to the thrusters 56(2), 56(3) in order to reduce the normal mean error, preferably, reduces linearly to zero as the system 50 moves to the target coordinates. At the point where the normal to the mean error reaches zero and assuming that the sea current direction has not changed, the system 50 will exactly be located above the target position on the sea bed 4 and the thrusters 56(2), 56(3) are powered to keep the system 50 on the correct coordinates and to correct for the sea current.

If the sea current direction changes the control loops referred to above will be required to adjust the power applied to the thrusters and ultimately to change the system direction. As the new current direction acts upon the system 50, the normal mean error will start to increase as the system 50 is moved from the target coordinates. To overcome this effect, the size of the normal mean error will again be controlled to reduce to zero. The system direction is changed such that the sea current or natural drift of the system 50 is counteracted.

The direction of rotation of the rotary actuators 65(1), 65(2) will be defined by the sign of the normal mean error. To reduce the time required to slew the rotary actuators 65(1), 65(2) to the required position, an algorithm will be used by the thruster control processor 240 to determine the shortest route to the required orientation.

It is envisaged that manual control by means of, for instance, a joystick (not shown) connected to the navigation processor 202 is also arranged.

During the positioning of the system 50 a velocity control is also, preferably, applied. Preferably, the closer is the system 50 to the coordinates of the target, the slower will be the velocity of the system 50. For instance, when the distance between the system 50 and the target is more than a predetermined first threshold value, the thrusters are controlled to provide the system 50 with a maximum velocity. Between this first threshold value and a second threshold value of the distance to the target coordinates, the second threshold value being lower than the first threshold value, a linearly decreasing velocity profile is used. Within a distance smaller than the second threshold value the system is kept on a velocity of substantially zero.

USBL Measurement

The USBL measurement principle is based on an accurate phase measurement between two transducers. In one embodiment, a combination of short base line (SBL) and ultra short base line (USBL) is used which enables to use a large distance between transducers without any phase ambiguity. For an USBL, the accuracy depends on the signal to noise ratio and the distance between the transducers (like in an interferometry method). Then, the trade-off is for frequency which is limited by the range and hydro-dynamic part in terms of dimensions.

Ambiguity is calculated by using an SBL measurement combined with correlation data processing. The signal-to-noise ratio is improved by use of such correlation processing. The following expression defines the general accuracy for a USBL:

$$\sigma_\theta = K \frac{\lambda}{L \sqrt{\frac{signal}{noise}} \cos\theta}$$

where:
$\sigma_\theta$: Angular standard deviation
L: transducer distance
$\lambda$: wavelength
$\theta$: bearing angle The expression given above indicates that the accuracy is improved by increasing the transducer distance L, i.e., by increasing the array. Moreover, a higher frequency results in a better accuracy. Hydrodynamic aspects and phase ambiguity reduce these parameters. Signal-to-noise ratio is increased by using correlation data processing.

To optimize range and accuracy, a frequency of 16 kHz is preferably used for phase meter measurements. A correlation process enables to increase the distance range while keeping a narrow pulse length for multipath discrimination.

For ambiguity phase measurements, the system operates in SBL to determine a range sector and in USBL within the sector to achieve the best accuracy.

The range may be increased beyond 8000 m by using a rather low frequency.

Appendix A

Kalman Filter

The Kalman filter is probably the most well-known technique in the offshore industry. It gives a fast filtering method based on comparison towards predicted values, which are calculated on basis of the latest history. We will not go into details about Kalman filtering, but refer to, e.g., "Kalman Filtering—Theory and Practice", by M. S. Grewal and A. P. Andrews Prentice Hall (ISBN 0-13-211335-X).

The position track can be combined with the velocity data (Doppler log), each point will be improved on basis of the neighboring points, the distance in time and the actual speed. The weight between Kalman value and the velocity improved is decided by the Doppler efficiency coefficient: higher values will take speed more into consideration.

| Advantage: | Disadvantage: |
|---|---|
| It's fairly fast | Rather 'un-smooth' result |
| Can be improved with speed | Not the best combination of speed and position |

Simple Filter

The Simple filter runs through all positions, and calculates a smooth curve giving a minimum squared error, i.e. a kind of Least Square Fit line

| Advantage: | Disadvantage: |
|---|---|
| It's fast | No Doppler-log data is used |
| The result is smooth | Does not like curved tracks |

Salomonsen Filter

The Salomonsen filter, which is named after the Danish mathematician Hans Anton Salomonsen, Professor and phD at University of Aarhus, is a highly integrated filter. It takes advantage of the short-term stability of the Doppler track and combines it with the long-term robustness of the position track.

Description

The filter is used in a situation where we have time tacked position data along a track as well as Doppler data. The Doppler Data are usually very precise but do not give any information about the absolute positions. On the other hand the position data are absolute positions but they are usually not very precise. The filter combines the two sets of data to produce a precise track with absolute positions. This is done as follows.

1. The Doppler data are used to construct the shape of the track, i.e. a tack formed as a cubic spine.
2. Beginning at the origin (0, 0) and with velocities as defined by the Doppler data
3. Then the position data are used to position the track correctly. The track is translated, rotated, and stretched/compressed linearly to fit the position data as well as possible using least squares techniques.
4. It will mainly be a translation. However, the other modifications serve to correct for possible systematic errors in the Doppler data.

The fact that the position data are used only to make the modifications in 2 means that the position data are subject to considerable averaging. This reduces the uncertainty of the position measurements. Thus, if there are many position data the absolute position of the track should be expected to be much more precise than each single position measurement.

H. A. Salomonsen

Mathematical Description

The algorithm is divided into five steps:

Step 1:

Calculate accelerations for each point $$1/2 hk+1(X1''+Xk+1'')=Xk+1'-Xk'$$

Where hk=tk−tk−1
tk=timestamp for speed measurement
Xk'=speed measurement at tk
Xk''=calculated acceleration at tk Step 2:

Calculate next position based on acceleration and speed, and previous calculated position (based on previous speed measurements and accelerations)

$$Xk+1=Sqr(hk+1)/6(2Xk''+Xk+1')+hk+1Xk'+Xk$$

Where xk=calculated position at tk (speed timestamp)

Step 3:

Calculate the positions at actual timestamps (using position of first speed measurements)

$$X(t)=1/2hk+1\{((hk+1)^2(t-tk)+1/3(tk+1-t)^3-1/3(hk+1)^3)Xk''+1/3(t-tk)^3Xk+1''\}$$

Where

X(t)=position at time t

Step 4:

Add position of first speed measurements to calculated positions

Step 5:

Move, rotate, stretch of compress calculated positions to best fit of real position line

| Advantage: | Disadvantage: |
|---|---|
| It combines the best of Doppler and positions. | It is slow due to complex matrix Dependent on good Doppler-log |
| Takes all data in consideration | |
| The result is smooth | |

Salomonsen Light

The light version of Salomonsen filter, which was first introduced in the NaviBat On-line program, was invented to have a faster solution combining the better of two methods.

Due to its on-line nature, it only uses history in deciding to filter a point. Hence the result will be rougher at the start of line and getting better as it moves along.

Basic Operation

The filter is started with a reset call to initialize the filter. The reset is made using the first velocity measurement. The filter uses both velocity and position data. A cubic spine curve is created using the velocity records and fitting the positions as good as possible to this curve.

Then the filter is reading a position record it is stored for later processing.

When a velocity record is read a 'knot' is created. Any positions read between the previous and the present velocity records (in time) are adjusted to fit the curve.

History

The filter gain parameter, value 0 to 1, controls the influence of Doppler-log data and history on the current point.

For the value 1 the Doppler-log data and history in the line have the greater weight. Smaller values are only when there are more position records than valid, velocity records.

Useful values will be in the range 0.9 to 1, e.g. 0.99.

Error Correction

The position and velocity records may be compared with predicted values using previous data limits may be set when to reject data.

Resetting

If there are many erroneous data points there is a risk that the filter looses track. The operator may reset the filter manually, i.e. kill its history (attempts are made to design an auto-reset).

| Advantage: | Disadvantage: |
|---|---|
| It combines the best of Doppler and positions | 'un-smooth' at the start of line |
| It is fast | |
| The overall result is smooth | |
| Can handle noisy Doppler data | |

What is claimed is:

1. Apparatus (50) for deploying an object (43) to an underwater target position, the apparatus being provided with a beacon to transmit acoustic rays to a surface vessel for determining a position of the apparatus and a plurality of thrusters (56($i$), i=1,2, . . . I, I being an integer) to control positioning of said apparatus with respect to said underwater target position, wherein the apparatus is provided with a sound velocity meter (258) to continuously measure velocity of sound in a fluid surrounding said apparatus during descent and recovery and to transmit sound velocity data in real-time to the surface vessel for updating calculated sound velocity profiles in the fluid as a function of depth in real-time and correcting the determined position of the apparatus.

2. Apparatus according to claim 1, wherein said thrusters comprise a first set of thrusters (56(1), 56(4)) arranged to provide a torque control function and a second set of thrusters (56(2), 56(3)) arranged to provide at least a translation function, each thruster of said second set of thrusters (56(2), 56(3)) being provided with a rotary actuator (65(1), 65(2)).

3. Apparatus according to claim 1, wherein said apparatus is provided with a gyrocompass with motion sensors (256) to sense roll and pitch of the apparatus in use.

4. Apparatus according to claim 1, wherein the apparatus is provided with a sonar unit (260) to determine the position of said apparatus with respect to at least one object external to said apparatus.

5. Apparatus according to claim 4, wherein the apparatus is provided with a Doppler log unit (266) to measure current strength of said fluid.

6. Apparatus according to claim 1, comprising load cells (268) to measure weight of a load (43) engaged by the apparatus.

7. Apparatus according to claim 1, wherein the apparatus is provided with a temperature sensor (266) to measure temperature in said fluid and to transmit temperature data in real-time.

8. Apparatus according to claim 1, wherein the apparatus is provided with a salinity meter (266) to measure salinity of said fluid and to transmit salinity data in real-time.

9. A processing arrangement arranged to drive an apparatus (50) for deploying an object (43) to an underwater target position, the apparatus being provided with a beacon to transmit acoustic rays to a surface vessel for determining a position of the apparatus, a plurality of thrusters (56(i), i=1,2, . . . I, I being an integer) to control positioning of said apparatus with respect to said underwater target position, and a sound velocity meter (258) to continuously measure velocity of sound in a fluid surrounding said apparatus during descent and recovery and to transmit sound velocity data in real-time, the processing arrangement being provided with an acoustic receiver (250) to receive said acoustic rays, the processing arrangement is arranged to use data derived from said acoustic rays in a calculation to determine the position of the apparatus, the processing arrangement being arranged to receive on-line sound velocity meter data from said sound velocity meter (258) to continuously update a sound velocity profile in said fluid as a function of depth and to calculate from said sound velocity profile bending of said acoustic rays transmitted by the apparatus through the fluid and to use this in the updated sound velocity profile to correct the calculation to determine the position of said apparatus in real-time.

10. Processor arrangement according to claim 9, wherein said thrusters of the apparatus comprise a first set of thrusters (56(1), 56(4)) arranged to provide a torque control function and a second set of thrusters (56(2), 56(3)) arranged to provide at least a translation function, each thruster of said second set of thrusters (56(2), 56(3)) being provided with a rotary actuator (65(1), 65(2)), and said processing arrangement is arranged to perform the following functions in use:

to control application of driving power to said thrusters of said first set of thrusters (56(1), 56(4)) to keep said apparatus in a desired orientation in a first plane defined by driving forces generated by said thrusters (56(1), 56(4)) of said first set;

to control application of driving power to said thrusters of said second set of thrusters (56(2), 56(3)) and to said rotary actuators (65(1), 65(2)) to move said apparatus in a mean direction and a direction perpendicular to said mean direction to a desired location, said mean direction and said direction parallel to said mean direction being in a second plane defined by driving forces generated by said thrusters (56(1), 56(4)) of said second set.

11. A processing arrangement according to claim 10, in said apparatus said first and second plane not being coincident, the processing arrangement being arranged to receive first sense signals from a gyrocompass with motion sensors (256) on the apparatus (50) regarding roll and pitch of the apparatus in use.

12. A processing arrangement according to claim 11, wherein the first sense signals from the gyrocompass with motion sensors (256) are used in the calculation to determine the attitude of the apparatus.

13. A processing arrangement according to claim 9, the apparatus including a temperature sensor (266), wherein the processing arrangement is arranged to receive temperature data from said temperature sensor, to update a temperature profile in said fluid and to assist a correction of determining the position of said apparatus in real-time.

14. A processing arrangement according to claim 9, the apparatus including a salinity meter (266), wherein the processing arrangement is arranged to receive salinity data from said salinity meter, to update a salinity profile in said fluid and to correct determining the position of said apparatus in real-time.

15. A vessel provided with a processing arrangement according to claim 9.

16. A vessel according to claim 15, wherein the vessel is provided with an acoustic array (250) attached to a hull of the vessel and an ultra short base line surface unit (234) on board of the vessel arranged to communicate with said acoustic array (250), the acoustic array (250) being arranged to receive acoustic signals from at least said apparatus (50) and to provide acoustic array output data to said processing arrangement, which is arranged to perform, in real-time, the calculation of the position of at least said apparatus (50) relative to said acoustic array (250) based on said acoustic array output data.

17. A vessel according to claim 16, wherein the acoustic array (250) comprises a sound velocity meter (248) to measure velocity of sound in fluid layers just below the vessel and to provide sound velocity meter output data to said processing arrangement, said processing arrangement being arranged to correct said calculation of said position of said apparatus (50) based on said sound velocity meter output data in real-time.

18. A vessel according to claim 16, wherein the acoustic array (250) comprises an acoustic array gyrocompass (252) to measure heave, roll and pitch of the acoustic array (250) and to provide acoustic array gyrocompass output data to said processing arrangement, the processing arrangement being arranged to correct said calculation of said position of said apparatus (50) based on said acoustic array gyrocompass output data in real-time.

19. A vessel according to claim 15, wherein the vessel comprises a vessel gyrocompass (206) to measure heave, roll and pitch of the vessel and to provide vessel gyrocompass output data to said processing arrangement, the processing arrangement being arranged to correct said calculation of said position of said apparatus (50) based on said vessel gyrocompass output data in real-time.

20. A system comprising a vessel according to claim 15, the apparatus and the processing arrangement being arranged to communicate with one another.

21. A system according to claim 20, wherein the apparatus and the processing arrangement are coupled via fiber optic (de)multiplexers (244, 246) interconnected by an optical fiber.

22. A method of driving an apparatus (50) for deploying an object (43) to an underwater target position, the apparatus being provided with a beacon to transmit acoustic rays to a surface vessel for determining a position of the apparatus, a plurality of thrusters (56($i$), i=1,2, . . . I, I being an integer) to control positioning of said apparatus with respect to said underwater target position, and a sound velocity meter (258) to continuously measure velocity of sound in a fluid surrounding said apparatus during descent and recovery and to transmit sound velocity data in real-time, the method comprising the steps of:

receiving said acoustic rays from the beacon, using data derived from said acoustic rays in a calculation to determine the position of the apparatus, receiving sound velocity meter data from said sound velocity meter (258) and continuously updating a sound velocity profile in said fluid as a function of depth, and calculating from said sound velocity profile bending of said acoustic rays transmitted by the apparatus through the fluid and using the updated sound velocity profile to correct calculation to determine the position of said apparatus.

23. A computer program product comprising data and instructions that after being loaded by a processing arrangement provides said arrangement with the capacity to carry out a method according to claim 22.

24. A data carrier provided with a computer program product according to claim 23.

25. Apparatus according to claim 1, further comprising a second sound velocity meter (248) to measure velocity of sound in fluid layers just below the vessel and to provide sound velocity meter output data for correcting the position of the apparatus based on said sound velocity meter output data in real-time.

* * * * *